United States Patent [19]
Yonezawa et al.

[11] Patent Number: 5,794,585
[45] Date of Patent: Aug. 18, 1998

[54] CYLINDER INJECTION FUEL CONTROL DEVICE FOR AN INTERNAL-COMBUSTION ENGINE

[75] Inventors: Shiro Yonezawa; Hirofumi Ohuchi. both of Tokyo, Japan

[73] Assignee: Mitsubishi Denki Kabushiki Kaisha. Tokyo, Japan

[21] Appl. No.: 956,040

[22] Filed: Oct. 24, 1997

[51] Int. Cl.$^6$ .................... F02B 1/14; F02B 41/00
[52] U.S. Cl. ........................ 123/299; 123/27 R
[58] Field of Search .................... 123/299, 300, 123/27 R, 276 E, 543, 545

[56] References Cited

U.S. PATENT DOCUMENTS

| | | | |
|---|---|---|---|
| 5,170,760 | 12/1992 | Yamada | 123/299 |
| 5,271,362 | 12/1993 | Kobayashi | 123/299 |
| 5,460,128 | 10/1995 | Kruse | 123/27 R |
| 5,482,016 | 1/1996 | Ohishi | 123/299 |
| 5,553,579 | 9/1996 | Yoshida | 123/299 |
| 5,566,650 | 10/1996 | Kruse | 123/299 |
| 5,713,328 | 2/1998 | Anderson | 123/299 |

FOREIGN PATENT DOCUMENTS 2-169834   6/1990   Japan.
4-219445   8/1992   Japan.

*Primary Examiner*—Carl S. Miller
*Attorney, Agent, or Firm*—Sughrue, Mion, Zinn, Macpeak & Seas, PLLC

[57] ABSTRACT

A cylinder injection fuel control device for an internal-combustion engine provides a proper amount of fuel at the time of transient operation by reflecting the most up-to-date operational state in control. The cylinder injection fuel control device has a fuel injection valve for directly injecting fuel into each cylinder of an internal-combustion engine and it supplies the amount of fuel required for a single stroke of each cylinder by applying, to each fuel injection valve, an injection signal of a pulse width corresponding to the driving time of each fuel injection valve; wherein the injection signal applied in a single stroke of each cylinder is divided into three pulses, and the amount of fuel required for a single stroke is divided into three portions. A first injection signal and a second injection signal are respectively applied during a suction stroke, and a third injection signal is applies during a compression stroke to the fuel injection valve of each cylinder, and the amount of fuel supplied in response to the second injection signal is corrected in accordance with the operational state of the internal-combustion engine.

5 Claims, 11 Drawing Sheets

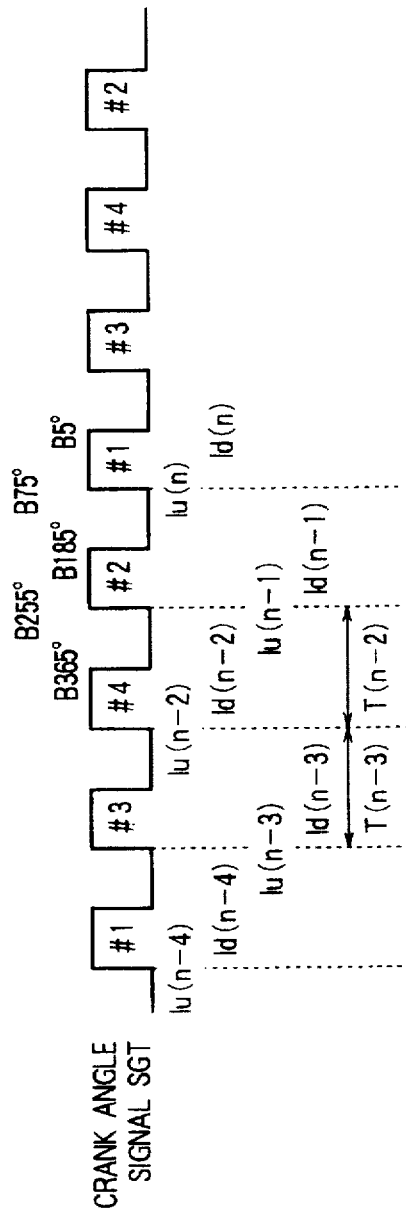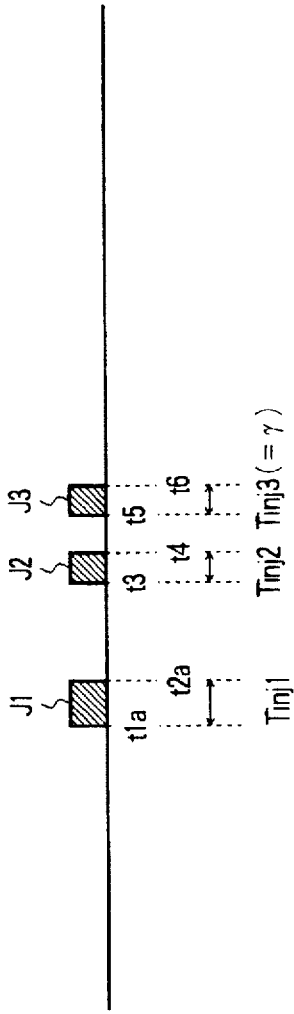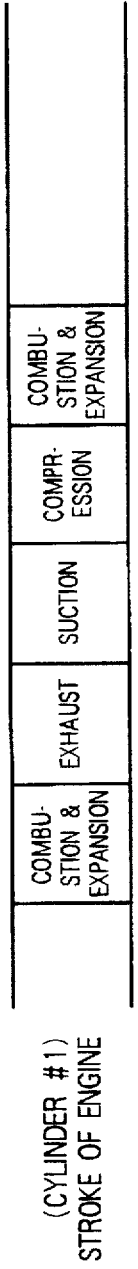
FIG. 6A  CYLINDER IDENTIFICATION SIGNAL SGC
FIG. 6B  CRANK ANGLE SIGNAL SGT
FIG. 6C  (CYLINDER #4) INJECTION SIGNAL J
FIG. 6D  (CYLINDER #1) STROKE OF ENGINE (INJECTION IN COMPRESSION STROKE)

(INJECTION IN SUCTION STROKE)

CYLINDER INJECTION FUEL CONTROL DEVICE FOR AN INTERNAL-COMBUSTION ENGINE

BACKGROUND OF THE INVENTION

1. Field of the Invention

The present invention relates to a cylinder injection fuel control device for an internal-combustion engine which directly injects fuel into a cylinder and, more particularly, to a cylinder injection fuel control device for an internal-combustion engine which permits a proper amount of fuel for transient operation to be easily obtained.

2. Description of Related Art

FIG. 7 is a block diagram showing the entire system of a typical cylinder injection fuel control device for an internal-combustion engine.

The system in the drawing includes: an engine 1 which provides the main body of the internal-combustion engine and which is composed of a plurality of cylinders 1a through 1d; an inlet pipe 2 which supplies air to the cylinders 1a through 1d of the engine 1; an air cleaner 3 provided at the inlet port of the inlet pipe 2; a throttle valve 4 which is installed in the inlet pipe 2 and which adjusts an inlet air amount Q; and a surge tank 5 provided in the intake manifold of the inlet pipe 2.

The system further includes: a throttle valve lift sensor 6 which detects lift θ of the throttle valve 4; a throttle valve actuator 7 which opens and closes the throttle valve 4; a fuel injection valve 8 which directly injects fuel into the cylinders 1a through 1d; an ignition coil unit 9 provided in each of the cylinders 1a through 1d; and a spark plug 10 driven and discharged through the ignition coil unit 9.

Further included in the system are: an accelerator pedal 11 operated by a driver who steps thereon; an accelerator depression sensor 12 which detects the amount of depression α of the accelerator pedal 11; a crank angle sensor 13 which is provided on a crankshaft of the engine 1 and which issues a crank angle signal SGT; a cylinder identifying sensor 14 which is provided on a cam shaft interlocked with the crankshaft and which issues a cylinder identification signal SGC; an oxygen concentration sensor 15 which detects the oxygen concentration X in the exhaust gas discharged from the engine 1; and a catalyst 16 which purifies exhaust gas.

The sensors 6 and 13 through 15 constitute the diverse sensors for outputting operational information. Other sensors such as an airflow sensor and an inlet pipe pressure sensor for detecting the inlet air amount Q are also provided although they are not shown.

An electronic control unit 20 is comprised of a microcomputer; it computes diverse types of control amounts according to the operational information θ, SGT, SGC, and X received from the various sensors 6 and 13 through 15 so as to control the engine 1 according to control signals J, G, and R based on the computed control amounts.

For instance, the electronic control unit 20 computes the target lift of the throttle valve 4 from the depression amount α of the accelerator pedal 11, and controls the throttle valve actuator 7 according to a lift control signal R, thereby conducting feedback control so that the lift θ of the throttle valve 4 coincides with the target lift.

The electronic control unit 20 computes engine speed Ne from the crank angle signal SGT, computes a target engine torque from the engine speed Ne and the depression amount α of the accelerator, computes a target fuel injection amount Fo from the engine speed Ne and the target engine torque To, and drives the fuel injection valve 8 according to the injection signal J of a duty based on the target fuel injection amount Fo.

The electronic control unit 20 computes the ignition timings for the cylinders 1a through 1d mainly according to the crank angle signal SGT and the cylinder identification signal SGC, and causes the spark plug 10 by driving the ignition coil unit 9 in accordance with the ignition signal G.

FIG. 8 is a block diagram detailedly showing the specific configuration of the electronic control unit 20 shown in FIG. 7.

The electronic control unit 20 shown in FIG. 8 includes: a microcomputer 21; input interfaces (I/Fs) 22 and 23 which take various types of operational information into the microcomputer 21; a power circuit 24 which supplies electric power to the microcomputer 21; and an output I/F 25 which outputs the control signals R, J, and G received from the microcomputer 21. An ignition switch 27 connects an on-car battery 26 to the electronic control unit 20 at the time of startup.

The microcomputer 21 is equipped with: a CPU 31 which mainly controls the fuel injection valve 8 and the spark plug 9 according to a predetermined program; a free-running counter 32 for detecting the rotational cycle from the crank angle signal SGT; a timer 33 for measuring time for performing diverse types of control; and an analog-to-digital converter 34 for converting an analog signal received from the input I/F 23 to a digital signal; a RAM 35 used as the work area of the CPU 31; a ROM 36 wherein an operating program for the CPU 31 has been stored; an output port 37 through which various driving control signals such as J, R, and G are output; and a common path 38 for connecting the CPU 31 with the constituent elements 32 through 37.

The input I/F 22 shapes the waveforms of the crank angle signal SGT and the cylinder identification signal SGC and supplies the shaped waveforms to the microcomputer 21 as interrupt signals. When an interrupt signal is received from the input I/F 22, the CPU 31 in the microcomputer 21 reads the value on the counter 32, computes the pulse cycle of the crank angle signal SGT from the difference between the present value and the previous value, and stores it as the value corresponding to the current engine speed Ne in the RAM 35.

The CPU 31 also detects, at the time of the interrupt, the signal level of the cylinder identification signal SGC to detect which of a plurality of the cylinders 1a through 1d corresponds to the crank angle signal SGT detected this time.

The input I/F 23 supplies the detection signals such as the throttle valve lift θ, the cylinder pressure P, accelerator depression amount α, and oxygen concentration x to the CPU 31 in the microcomputer 21 via the analog-to-digital converter 34.

The output I/F 25 amplifies the diverse control signals issued from the CPU 31 via the output port 37 and supplies them to the throttle valve actuator 7, the fuel injection valve 8, the ignition coil unit 9, etc.

FIG. 9A through FIG. 9D show timing charts illustrative of the control timings of the injection signal J and the ignition signal G generated by the electronic control unit 20; they illustrates the relationship between the pulse waveforms of the cylinder identification signal SGC and the crank angle signal SGT, and the fuel injection timing of the fuel injection valve 8 and the engine strokes, namely, suction, compression, combustion and expansion, and exhaust.

FIG. 9A shows the pulse waveform of the cylinder identification signal SGC; FIG. 9B shows the pulse waveform of the crank angle signal SGT; FIG. 9C shows the injection signal J for driving the fuel injection valve 8 of cylinder #1; and FIG. 9D shows the engine strokes of cylinder #1.

The ignition signal G for the ignition coil unit 9 is issued at the ignition timing of the spark plug 10, i.e. immediately before the combustion and expansion stroke of FIG. 9D.

In FIG. 9B, T(n−3) denotes the interval of rising edges of the crank angle signal SGT used for arithmetic operation; it is computed from the third and fourth pulses, i.e. the pulses corresponding to cylinders #3 and #4, before the present pulse corresponding to cylinder #1. Iu(i) and Id(i) (i=n, n−1, n−2, . . . ) respectively denote the rising edge and the falling edge of the crank angle signal SGT; i=n for the timing of the compression stroke of cylinder #1, which corresponds to the ignition timing.

B5 degrees, i.e. 5 degrees before the top dead center (TDC), corresponds to the crank angle position at the falling edge Id(n) of the crank angle signal SGT of cylinder #1; B75 degrees denotes the crank angle position of the rising edge Iu(n) of the crank angle signal SGT of cylinder #1; B185 degrees denotes the crank angle position of the falling edge Id(n−1) of the crank angle signal SGT of cylinder #2; and B255 degrees denotes the crank angle position at the rising edge Iu(n−1) of the crank angle signal SGT of cylinder #2.

In other words, the edges Iu(i) and Id(i) of the crank angle signal SGT denote the reference crank angle positions of cylinders #1 through #4; the rising edge Iu(i) indicates B75 degrees, and the falling edge Id(i) indicates B5 degrees.

The CPU 31 in the microcomputer 21 detects a change in voltage at each edge of the crank angle signal SGT by an edge interrupt thereby to detect the crank angle position of the engine 1.

In FIG. 9C, t1 denotes the rising time of the injection signal J, t2 denotes the falling time of the injection signal J, and Tinj denotes the pulse width of the injection signal J from time t1 to time t2, i.e. the time during which the fuel injection valve 8 is driven or the time during which fuel is injected.

The rising time t1 of the injection signal J is set by a timer so that fuel is supplied during the first half of the suction stroke.

For instance, the CPU 31 computes fuel injection amount Fo to be injected to a cylinder under control from the cycle T(n−3) of the crank angle signal SGT, the inlet air amount Q (n−3), etc. and also computes the time Tinj for driving the fuel injection valve 8 to determine the target fuel amount Fo.

In this case, the fuel injection valve 8 is driven only for the driving time Tinj in the suction stroke.

The CPU 31 in the electronic control unit 20 determines the correspondence between the crank angle signal SGT and the cylinders according to the cylinder identification signal SGC and injects fuel of the predetermined amount Fo to the fuel injection valve 8 of the cylinder under control by applying the injection signal J based on the fuel injection timing.

The CPU 31 issues the ignition signal G based on the ignition timing to the ignition coil unit 9 of the cylinder under control. This causes the ignition coil unit 9 to apply the high voltage obtained by amplifying battery voltage to the spark plug 10 to ignite and burn the fuel at the computed control timing.

Thus, fuel is directly injected into the cylinders 1a through 1d, and the injected fuel burns to operate the engine 1.

The specific operation of a conventional cylinder injection fuel control device for an internal-combustion engine configured as shown in FIG. 7 and FIG. 8 will now be described with reference to the timing charts of FIG. 9A through FIG. 9D, the schematic representations and the characteristic charts of FIG. 10 through FIG. 13, and the flowcharts of FIG. 14 through FIG. 16.

FIG. 10 illustrates the relationship between the fuel injection mode and the engine speed Ne and the target engine torque To. The hatched area wherein the target engine torque To is ToA or less and the engine speed Ne is NeB or less indicates that the engine 1 consumes a smaller amount of fuel per cycle.

Hence, in the aforesaid area, the driving time Tinj of the fuel injection valve 8 can be set to a smaller value, and the compression stroke injection mode in which the fuel is injected during the compression stroke of the engine 1 is implemented. In the compression stroke injection mode, the combustion takes place locally in the cylinders 1a to 1d, namely, in the vicinity of the spark plugs 10, requiring less fuel relative to a cylinder volume. This provides an advantage in that better economy and easier control of the air/fuel ratio for combustion can be achieved.

FIG. 11 is a characteristic chart illustrative of the relationship between the air/fuel ratio A/F and the engine-generated torque Te; the solid line denotes the characteristic curve observed in the compression stroke injection mode, and the chain line denotes the characteristic curve observed in the suction stroke injection mode.

As is obvious from FIG. 11, the compression stroke injection enables the engine-generated torque Te to be controlled according to the air/fuel ratio A/F even when the stoichiometric air/fuel ratio (14.7) is set to a value for a leaner mixture.

Conversely, in FIG. 10, when the target engine torque To exceeds ToA or when the engine speed Ne exceeds NeB, the injection of the predetermined fuel amount Fo cannot be completed in the compression stroke. For this reason, the suction stroke injection is performed so that the fuel is injected during the period from the suction stroke to the compression stroke.

In the suction stroke injection mode, the same fuel injection and combustion state as those observed in an engine, not shown, wherein fuel is injected in the vicinity of the inlet port, will be obtained, so that combustion is implemented by using all the cylinder volume, providing an advantage of a higher engine output.

FIG. 12 and FIG. 13 are schematic representatives illustrative of the combustion states generated by the different fuel injection modes; FIG. 12 schematically shows the combustion state observed in the compression stroke injection mode, and FIG. 13 schematically shows the combustion state observed in the suction stroke injection mode.

The schematic representatives show a combustion chamber 40 in a cylinder of the engine 1, an intake valve 41 which communicates the combustion chamber 40 to the surge tank 5, an exhaust valve 42 which communicates the combustion chamber 40 to an exhaust pipe, a combustion area 50 wherein combustion takes place in the compression stroke injection mode, and a combustion area 51 wherein combustion takes place in the suction stroke injection mode.

As shown in FIG. 12, in the compression stroke injection mode, a small amount of fuel is injected into the combustion chamber 40, the fuel is gathered in the vicinity of the spark plug 10, then only the area around the spark plug 10 is burned as a layer of a concentrated mixture (see the combustion area 50).

At this time, even when the same inlet air amount Q of the engine 1 is used, the generated torque Te of the engine 1 changes depending on the amount of fuel injected in the vicinity of the spark plug 10; hence, the fuel injection amount Fo is changed according to the target engine torque To.

In the suction stroke injection mode, the fuel is injected during the suction stroke and dispersed in the entire area inside a cylinder, so that the combustion takes place in the entire area inside the cylinder as shown in FIG. 13 (see the combustion area 51).

Generally, if the fuel injection amount Fo is increased, whereas the air/fuel ratio A/F is set in the vicinity of the stoichiometric air/fuel ratio (14.7) which enables combustion, then the suction stroke injection mode shown in FIG. 13 is employed because the injection of the fuel cannot be completed during the compression stroke and the fuel cannot be sufficiently dispersed in a cylinder in the compression stroke injection mode.

FIG. 14 through FIG. 16 show the control processing carried out by the cylinder injection fuel control device to actually drive the fuel injection valve 8; FIG. 14 illustrates the interrupt processing at the rising edge Iu(n-2) of the crank angle signal SGT, FIG. 15 illustrates the timer interrupt processing at the rising time t1 of the injection signal J, and FIG. 16 illustrates the timer interrupt processing at the falling time t2 of the injection signal J.

First, the CPU 31 in the electronic control unit 20 computes the pulse cycle T(n-3) of the crank angle signal SGT shown in FIG. 9 from the difference between the time of the present rising edge Iu(n-2) and the time of the preceding rising edge Iu(n-3) in synchronization with the crank angle signal SGT by the interrupt processing of FIG. 14 (step S1).

Subsequently, based on the information received from the airflow sensor, the inlet pipe pressure sensor, etc. which are not shown, the CPU 31 computes in step S2 the inlet air amount Q(n-3) at the cycle T(n-3) between the rising edges Iu(n-3) to Iu(n-2), and it computes in step S3 the fuel injection amount Fo(n-2) from various types of operational information, namely, the parameters of the engine 1 including the cycle T(n-3) of the crank angle signal SGT and the inlet air amount Q(n-3).

The CPU further computes in step S4 the driving time Tinj for the fuel injection valve 8 from the computed fuel injection amount Fo(n-2) and it sets the timer in step S5 so that the timer interrupt by the microcomputer 21 occurs at time t1 at which fuel injection is started, then it exits from the timer interrupt processing of FIG. 14.

The CPU 31 issues the injection signal J at time t1 to drive the fuel injection valve 8 in step S6 according to the control amount calculated in steps S3 through S5 by the timer interrupt processing of FIG. 15.

Next, the CPU sets the timer in step S7 so that the timer interrupt occurs at the injection end time t2 when the driving time Tinj for the fuel injection valve 8 has passed from the current time t1, then it exits from the timer interrupt processing of FIG. 15.

As described above, in the conventional cylinder injection fuel control device for an internal-combustion engine, the fuel injection amount Fo(n-2) of a cylinder under control, for example, is computed using only the cycle T(n-3) and the inlet air amount Q(n-3) in the previous combustion and expansion stroke to exhaust stroke different from the suction stroke. This has been posing a problem in that, at the time of acceleration, the actual fuel injection amount F becomes insufficient, adversely affecting the accelerating performance, while fuel is oversupplied at the time of deceleration, making it difficult to decelerate.

There has been another problem in that it is difficult for fuel to be vaporized and the combustion tends to be unstable while the engine 1 is cold, and deteriorated exhaust gas is produced until the catalyst 16 becomes hot and activated after the engine is started.

SUMMARY OF THE INVENTION

Accordingly, the present invention has been made with a view toward solving the above problems and it is an object thereof to provide a cylinder injection fuel control device for an internal-combustion engine which provides a proper amount of fuel during transient operation by reflecting the most up-to-date operational state based on the inlet air amount and the crank angle cycle in computing the fuel injection amount in the cylinder injection engine.

It is another object of the invention to provide a cylinder injection fuel control device for an internal-combustion engine which permits a proper amount of fuel to be easily provided during transient operation, which promotes vaporization of the fuel, and immediately activates a catalyst when the engine is cold.

It is still another object of the invention to provide a cylinder injection fuel control device for an internal-combustion engine which permits a proper amount of fuel to be easily obtained during transient operation and which stabilizes engine output performance.

To these ends, according to one aspect of the present invention, there is provided a cylinder injection fuel control device for an internal-combustion engine which has a fuel injection valve for directly injecting fuel into each cylinder of the internal-combustion engine and which supplies the amount of fuel required for a single stroke of each cylinder by applying, to each fuel injection valve, an injection signal of a pulse width corresponding to the driving time of each fuel injection valve; wherein the injection signal applied for a single stroke of each cylinder is divided into three pulses, the amount of fuel required for a single stroke is divided into three portions, a first injection signal and a second injection signal are respectively applied during a suction stroke, and a third injection signal is applies during a compression stroke to the fuel injection valve of each cylinder, the amount of fuel supplied in response to the second injection signal being corrected in accordance with the operational state of the internal-combustion engine.

With this arrangement, the most up-to-date operational state, namely, the inlet air amount and the crank angle cycle, can be reflected in computing the amount of fuel for the second injection, so that the amount of fuel can be adjusted by the second injection signal, thereby allowing fuel of a proper amount to be injected during the transient operation. Thus, even during the transient operation at the time of acceleration or deceleration, the latest engine state can be reflected in the amount of fuel to be injected. This makes it possible to ensure a proper amount of fuel so as to prevent inadequate acceleration or unsuccessful deceleration.

According to another aspect of the present invention, there is provided a cylinder injection fuel control device for an internal-combustion engine which has a fuel injection valve for directly injecting fuel into each cylinder of the internal-combustion engine and which supplies the amount of fuel required for a single stroke of each cylinder by applying, to each fuel injection valve, an injection signal of a pulse width corresponding to the driving time of each fuel injection valve; wherein the injection signal applied for a single stroke of each cylinder is divided into three pulses, the amount of fuel required for a single stroke is divided into three portions, a first injection signal is applied during the exhaust stroke, a second injection signal is applied during a suction stroke, and a third injection signal is applied during a compression stroke to the fuel injection valve of each cylinder.

Thus, the fuel injected first is warmed by exhaust gas, so that the carburetion of fuel is expedited and a part of the fuel exhausted as it is burns to heat and activate a catalyst, making it possible to secure the engine performance especially when the engine is cold. This improves the combustion efficiency when the engine is cold and it also enables a part of the fuel injected in the exhaust stroke to be burnt in the vicinity of the catalyst, expediting the activation of the catalyst at the time of startup of the engine.

In a preferred form of the present invention, the cylinder injection fuel control device for an internal-combustion engine corrects the amount of fuel supplied in response to the second injection signal according to the operational state of the internal-combustion engine. This makes it possible to provide output performance suited to the operational state of the engine, ensuring the proper amount of fuel to be supplied in transient operation.

In another preferred form of the present invention, the cylinder injection fuel control device for an internal-combustion engine sets the amount of fuel to be supplied in response to the third injection signal to a fixed value. This permits stable output performance without affecting the combustion state of the engine.

BRIEF DESCRIPTION OF THE DRAWINGS

FIG. 6A through FIG. 6D are timing charts illustrative of the fuel injection processing operation in accordance with a second embodiment of the present invention;

DESCRIPTION OF THE PREFERRED EMBODIMENTS

First Embodiment

A first embodiment of the present invention will now be described in conjunction with the accompanying drawings. The configuration of the entire system of the first embodiment of the invention is the same as those shown in FIG. 7 and FIG. 8 and it has already been described; hence the description thereof will be omitted.

FIG. 1A through FIG. 1D are timing charts illustrating the fuel injection method in accordance with the first embodiment of the invention. As in the case previously described, the timing charts illustrate a case wherein the rising edge of the crank angle signal SGT corresponding to the compression stroke of cylinder #1 is denoted by Iu(n), and attention is paid to the fuel injection of cylinder #1.

Figure 1A:
FIG. 1A through FIG. 1D are timing charts illustrative of the fuel injection processing operation in accordance with a first embodiment of the present invention.
Figure 1B:
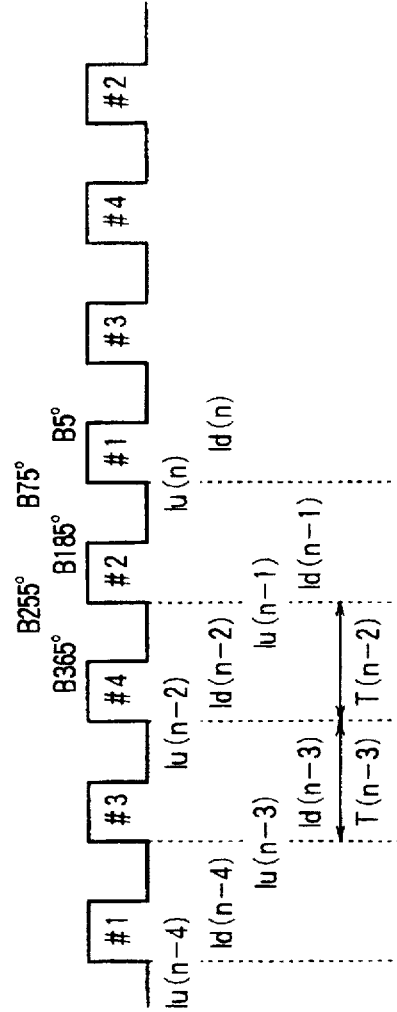
Figure 1C:
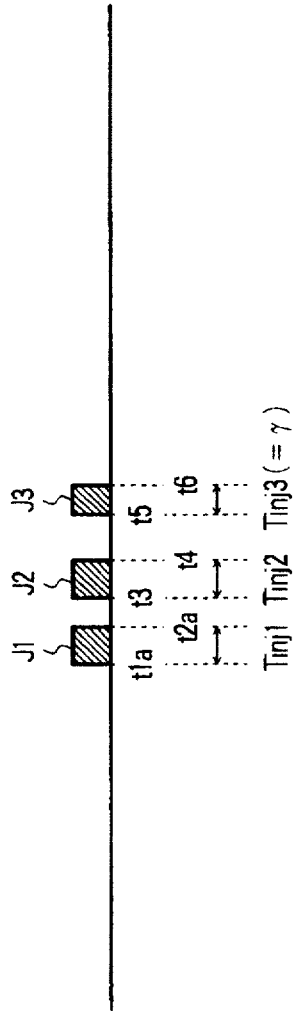
Figure 1D:
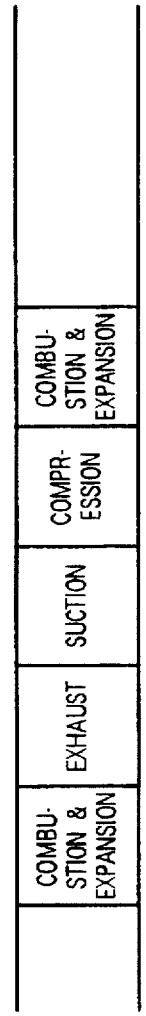

The timing charts shown in FIG. 1A through FIG. 1D are the same as those given in FIG. 9A through 9D except that an injection signal J of FIG. 1C is divided into three pulses J1 through J3.

J1 denotes the first injection signal in a suction stroke; J2 denotes the second injection signal in the suction stroke; and J3 denotes the third injection signal in a compression stroke.

t1a, t3, and t5 respectively denote the rising times of the injection signals J1 through J3; t2a, t4, and t6 respectively denote the falling times of the injection signals J1 through J3; and Tinj1 through Tinj3 denote the pulse widths of the injection signals J1 through J3, i.e. the driving times of a fuel injection valve 8.

Figure 7:
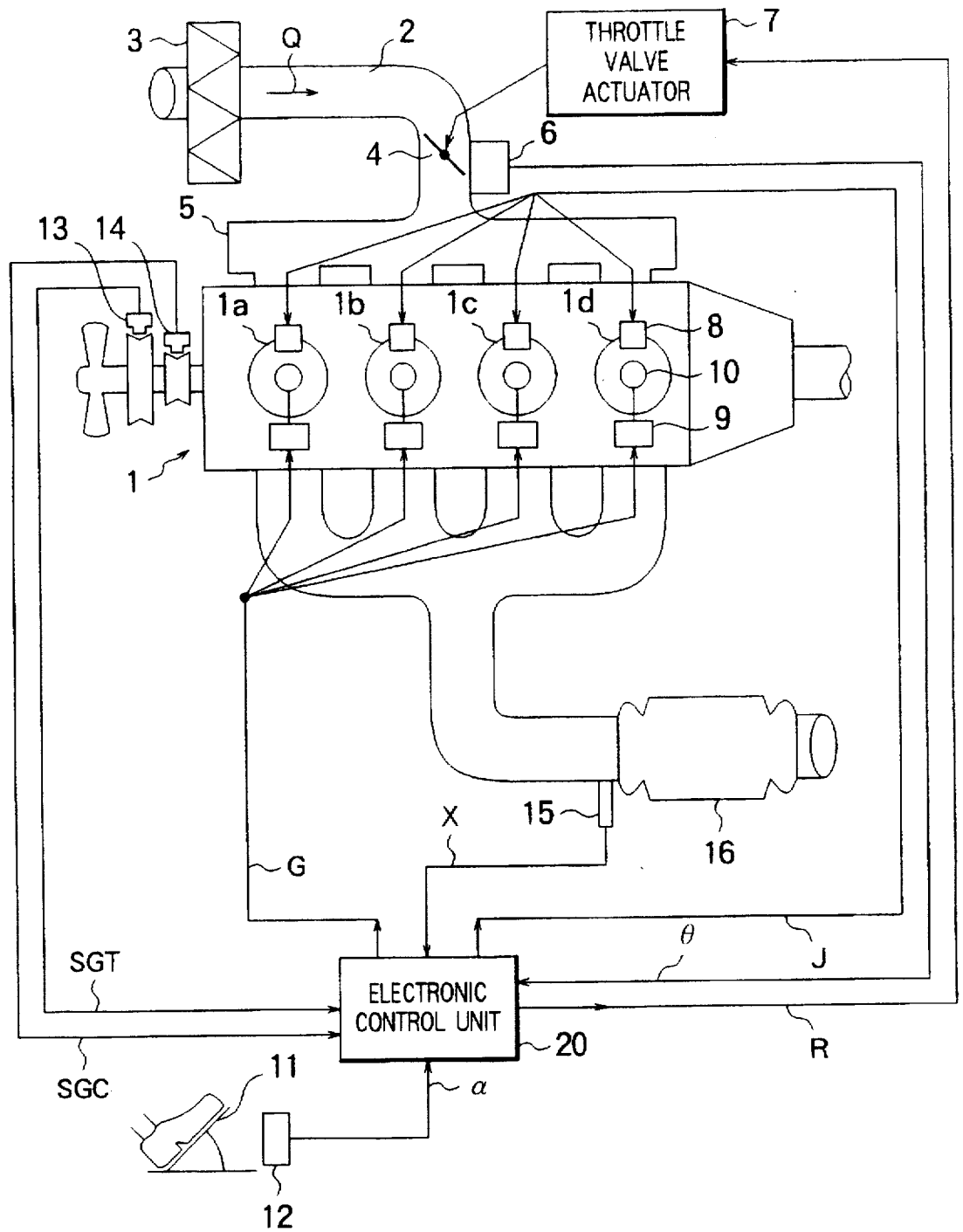
FIG. 7 is a block diagram showing the entire configuration of a typical cylinder injection fuel control device for an internal-combustion engine.
Figure 8:
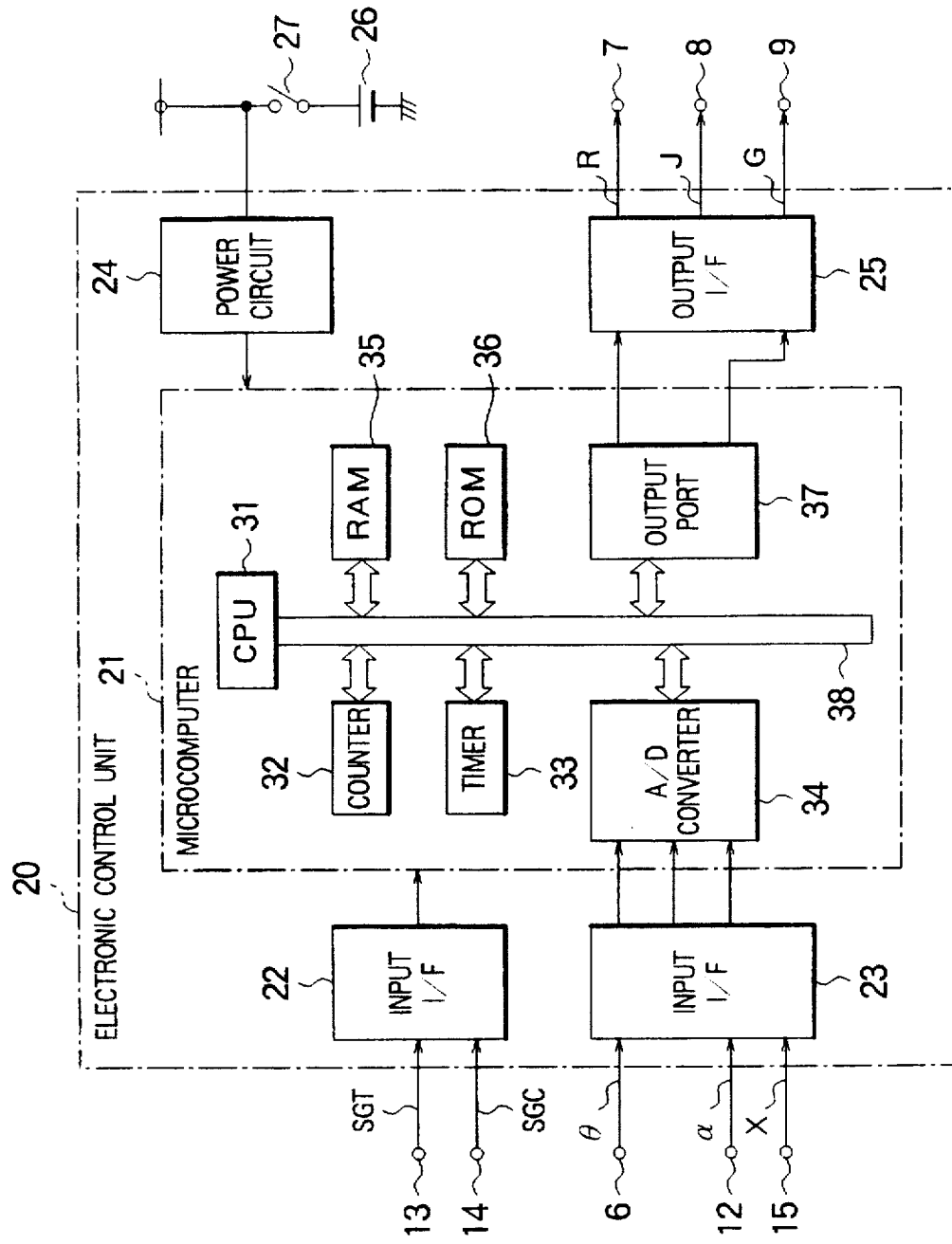
FIG. 8 is a block diagram showing a specific configuration example of an electronic control unit shown in FIG. 7.
Figure 9A:
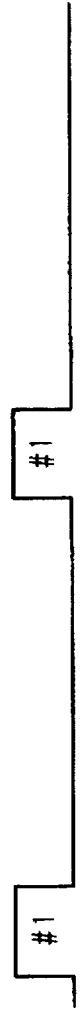
FIG. 9A through FIG. 9D are timing charts illustrative of the fuel injection processing operation performed by a conventional cylinder injection fuel control device for an internal-combustion engine.
Figure 9B:
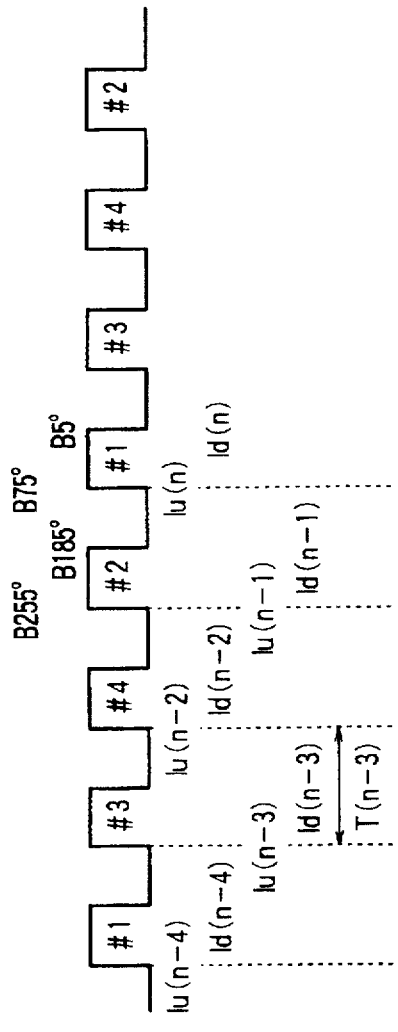
Figure 9C:
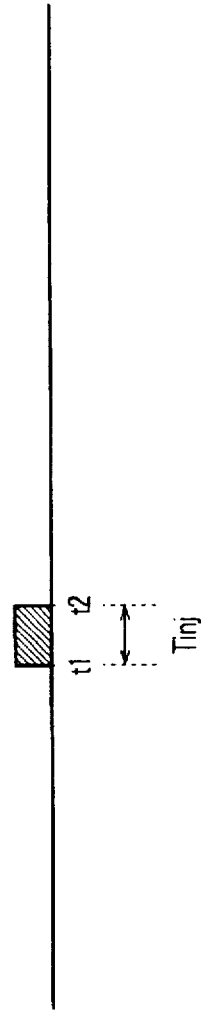
Figure 9D:
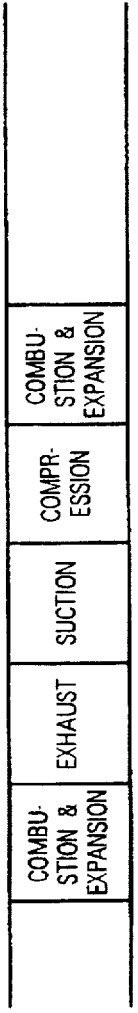
Figure 10:
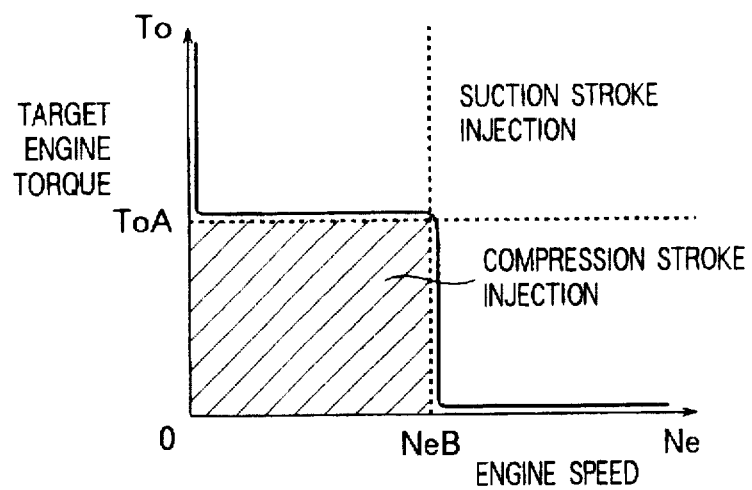
FIG. 10 is a schematic representation showing a typical relationship between engine speed, target engine torque, and fuel injection mode.
Figure 11:
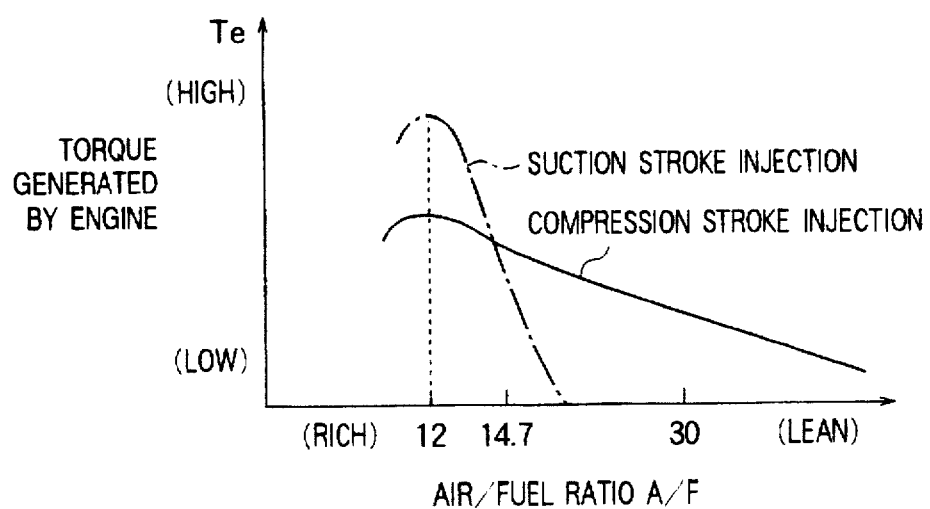
FIG. 11 is a characteristic chart showing a typical relationship between the air/fuel ratio and the torque generated by engine in a compression stroke injection mode and a suction stroke injection mode.

Referring now to FIG. 7 and FIG. 8 and the flowcharts shown in FIG. 2 through FIG. 5, the fuel injection processing operation according to the first embodiment of the present invention using the three injection signals J1 through J3 will be described.

Figure 2:
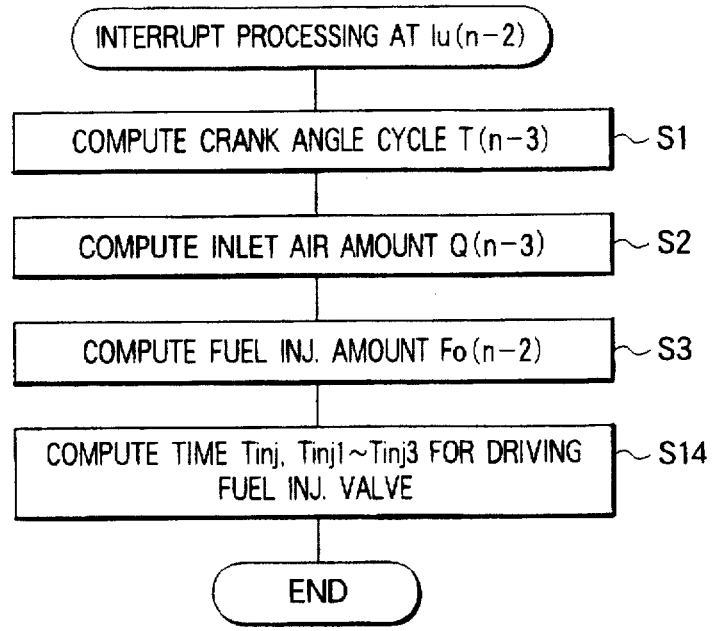
FIG. 2 is a flowchart illustrative of the interrupt processing operation at the rising edge of a crank angle signal of the fuel injection processing in accordance with the first embodiment of the present invention.
Figure 3:
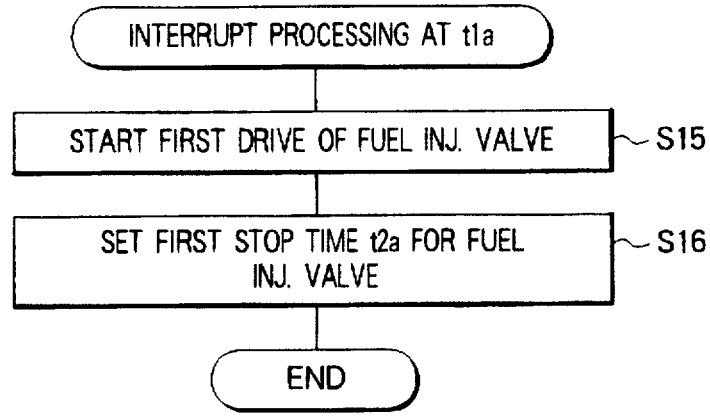
FIG. 3 is a flowchart illustrative of the timer interrupt processing operation at time t11 in the fuel injection processing in accordance with the first embodiment of the present invention.
Figure 4:
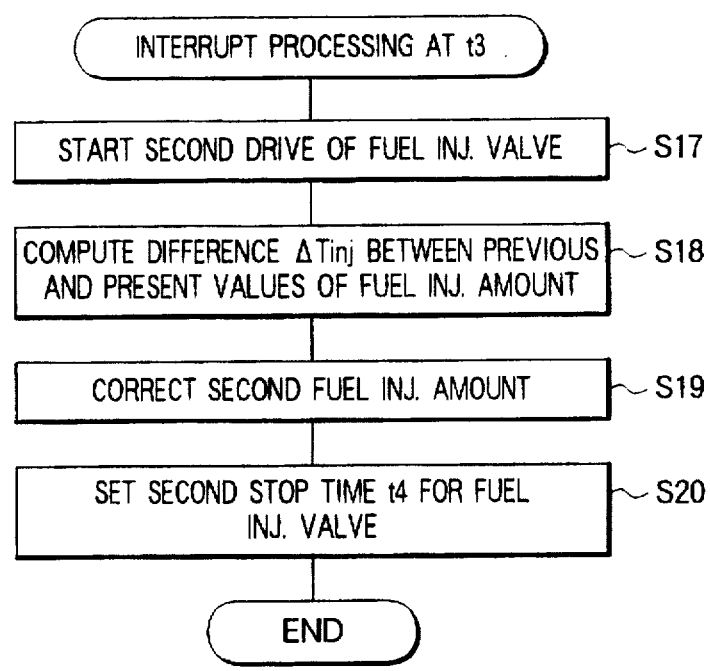
FIG. 4 is a flowchart illustrative of the timer interrupt processing operation at time t3 in the fuel injection processing in accordance with the first embodiment of the present invention.
Figure 5:
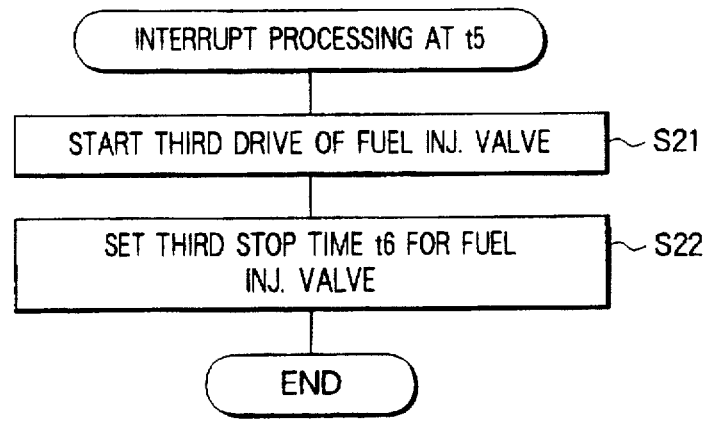
FIG. 5 is a flowchart illustrative of the timer interrupt processing operation at time t5 in the fuel injection processing in accordance with the first embodiment of the present invention.

FIG. 2 is the flowchart illustrating the interrupt processing at the rising edge Iu(n−2) of the crank angle signal SGT; S1 through S3 are the same steps as those previously described. FIG. 3 is the flowchart illustrating the timer interrupt processing at time t1a at which the first injection is carried out; FIG. 4 is. the flowchart illustrating the timer interrupt processing at time t3 at which the second injection is carried out; and FIG. 5 is the flowchart illustrating the timer interrupt processing at time t5 at which the third injection is carried out.

The interrupt processing shown in FIG. 2 is also implemented at the rising edges Iu(n−1) and Iu(n) of the next crank angle signal SGT in addition to Iu(n−2).

When an interrupt occurs at the rising edge Iu(n−2) of the crank angle signal SGT, the CPU 31 shown in FIG. 8 computes the previous cycle T(n−3) of the crank angle signal SGT from the time Iu(n−2) at which the present interrupt has occurred and the time Iu(n−3) at which the previous interrupt occurred, in the same manner as described above (step S1).

Then, the CPU 31 computes inlet air amount Q(n−3) in step S2, and also computes fuel injection amount Fo(n−2) from the computed cycle T(n−3) of the crank angle signal SGT and the computed inlet air amount Q(n−3) in step S3.

Further, the CPU 31 computes the pulse widths, i.e. driving times, Tinj1(n−2) through Tinj3(n−2) of the injection signals J1 through J3 corresponding to the three divided portions of target fuel injection amount Fo(n−2) according to expressions (1) through (3) given below (step S14).

$$Tinj1(n-2)=0.8 \times Tinj(n-2) \tag{1}$$

$$Tinj2(n-2)=0.2 \times Tinj(n-2)-\tau \tag{2}$$

$$Tinj3(n-2)=\tau \tag{3}$$

In other words, the first injection signal J1 supplies 80 percent of the target fuel amount Fo(n−2), while the second and third injection signals J2 and J3 supply the remaining 20 percent of the fuel. The third fuel injection time Tinj3(n−2) is a fixed value $\tau$ as in the case described above.

The CPU 31 also computes the total driving time Tinj(n−2) of the fuel injection valve 8 according to expression (4) to obtain the sum of the three driving times Tinj1(n−2) through Tinj3(n−2).

$$Tinj(n-2)=Tinj1(n-2)+Tinj2(n-2)+Tinj3(n-2) \tag{4}$$

Thus, in step S14, the CPU 31 sets the total driving time Tinj(n−2) corresponding to the target fuel amount Fo(n−2) and the driving times Tinj1(n−2) through Tinj3(n−2) obtained by dividing the target fuel amount Fo(n−2) by three, then it exits from the interrupt processing of FIG. 2 at the rising edge Iu(n−2).

In the following step, the CPU 31 carries out the first fuel injection by the timer interrupt processing of FIG. 3 at time t1a.

In other words, the fuel injection valve 8 is actuated by raising the first injection signal J1 from time t1a in the early stage of the suction stroke of cylinder #1 (step S15).

Subsequently, the CPU 31 sets, in step s16, the failing time t2a of the first injection signal J1, i.e. the time at which the drive of the fuel injection valve 8 is stopped, and it exits from the timer interrupt processing of time t1a shown in FIG. 3.

The first injection end time t2a is computed according to expression (5) below by using the first driving time Tinj1 (n−2) computed in step S14 shown in FIG. 2.

$$t2a=t1a+Tinj1(n-2) \tag{5}$$

Figure 16:
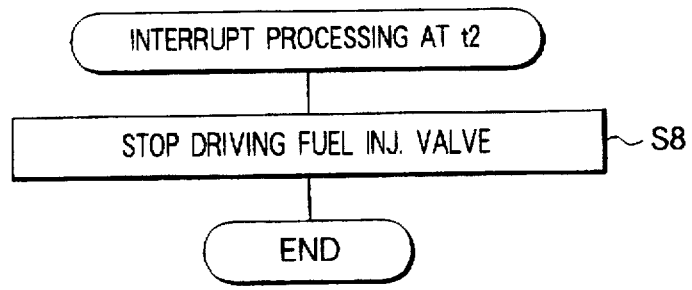
FIG. 16 is a flowchart illustrating the timer interrupt processing operation at time t2 of the fuel injection processing implemented by a conventional cylinder injection fuel control device for an internal-combustion engine.

At the falling time t2a of the first injection signal J1, the timer interrupt processing at time t2a, not shown, is implemented to stop driving the fuel injection valve 8 as in the same manner previously described in conjunction with FIG. 16.

Next, the same interrupt processing as that shown in FIG. 2 is carried out at the rising edge Iu(n−1) of the crank angle signal SGT to determine the crank angle cycle T(n−2) and the inlet air amount Q(n−2), then the driving time Tinjk(n−1) for the k-th drive (k=1, 2, 3) of the fuel injection valve 8 is computed according to expressions (6) through (8) as in the case of expressions (2) through (4) given above.

$$Tinj1(n-1)=0.8 \times Tinj(n-1) \tag{6}$$

$$Tinj2(n-1)=0.2 \times Tinj(n-1)-\tau \tag{7}$$

$$Tinj3(n-1)=\tau \tag{8}$$

Expressions (6) through (8) are the same as expressions (1) through (3) except that the computation processing timing (n−2) has been replaced by the present timing (n−1).

The total driving time Tinj(n−1) corresponding to the present target fuel amount Fo(n−1) is the sum of the driving times Tinj1(n−1) through Tinj3(n−1) obtained by using expressions (6) through (8).

The CPU 31 then executes the second fuel injection by the timer interrupt processing of FIG. 4 at time t3.

In other words, the fuel injection valve 8 is actuated by raising the second injection signal J2 from time t3 in the later half of the suction stroke of cylinder #1 (step S17).

Subsequently, the CPU 31 sets the amount of fuel to a value according to a change in the operational state, and computes time difference ΔTinj(n−1) between the previous total driving time Tinj(n−2) and the present total driving time Tinj(n−1) according to expression (9) shown below in order to correct fuel injection amount F for a transient operation (step S18).

$$\Delta Tinj(n-1)=Tinj(n-1)-Tinj(n-2) \tag{9}$$

Using the driving time difference ΔTinj(n−1) computed according to the above expression, the CPU 31 corrects the driving time Tinj2(n−2) for the fuel injection valve 8 based on the second injection signal J2 according to expression (10) so as to obtain the updated second driving time Tinj2 (n−1) (step S19).

$$Tinj2(n-1)=Tinj2(n-2)+\Delta Tinj(n-1) \tag{10}$$

Subsequently, the CPU 31 sets, in step S20, the falling time t4 of the second injection signal J2, i.e. the time at which the drive of the fuel injection valve 8 is to be stopped, according to expression (11), then exits from the timer interrupt processing of t3 shown in FIG. 4.

$$t4=t3+Tinj2(n-1) \tag{11}$$

When the timer setting for the second injection signal J2 has been completed, the timer interrupt processing for dropping the injection signal J2, not shown, is implemented at time t4 as in the case described above.

Then, the CPU 31 carries out the third fuel injection by the timer interrupt processing at time t5 shown in FIG. 5.

In other words, the fuel injection valve 8 is actuated by raising the third injection signal J3 at time t5 (step S21).

After that, the CPU 31 sets, in step S22, the falling time t6 of the third injection signal J3, i.e. the time at which the drive of the fuel injection valve 8 is to be stopped, according to expression (12) given below, and exits from the timer interrupt processing of time t5 shown in FIG. 5.

$$t6=t5+\tau \tag{12}$$

Thus, the three injection signals J1 through J3 are used for a cylinder under control, so that the first injection signal J1 is issued in the first half of the suction stroke, the second injection signal J2 is issued in the latter half of the suction stroke, and the third injection signal J3 is issued in the compression stroke. This makes it possible to compute the most up-to-date fuel injection amount Fo(n−1) computed from the most up-to-date crank angle cycle T(n−1), the inlet air amount Q(n−1), etc. at the time when the fuel injection is started in response to the second injection signal J2.

Fuel amount F1 injected in response to the first injection signal J1, i.e. pulse width Tinj1, is a known value based on the previous operational state. Fuel amount F3 injected in response to the third injection signal J3, i.e. pulse width τ, is a fixed value. Adjusting the fuel amount F2 injected in response to the second injection signal J2 according to the present operational state enables the total fuel injection amount F to coincide with the target fuel amount Fo based on the latest operational state of the engine.

Hence, even in a transient operation at the time of acceleration or deceleration, the latest state of the engine can be reflected in control, thus making it possible to prevent inadequate acceleration or deterioration in decelerating performance.

Figure 12:
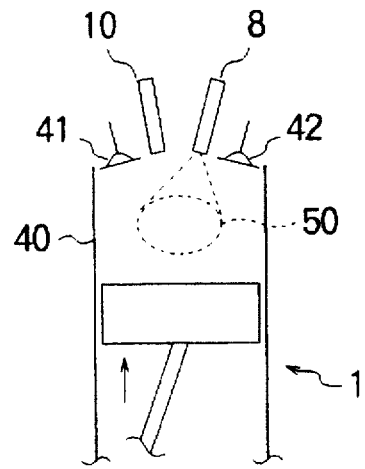
FIG. 12 is a schematic representation illustrating a typical combustion state observed in the compression stroke injection mode.
Figure 13:
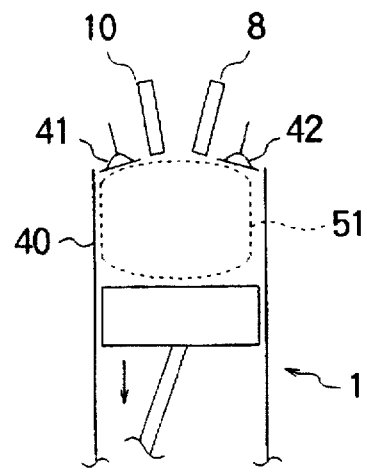
FIG. 13 is a schematic representation illustrating a typical combustion state observed in the suction stroke injection mode.
Figure 14:
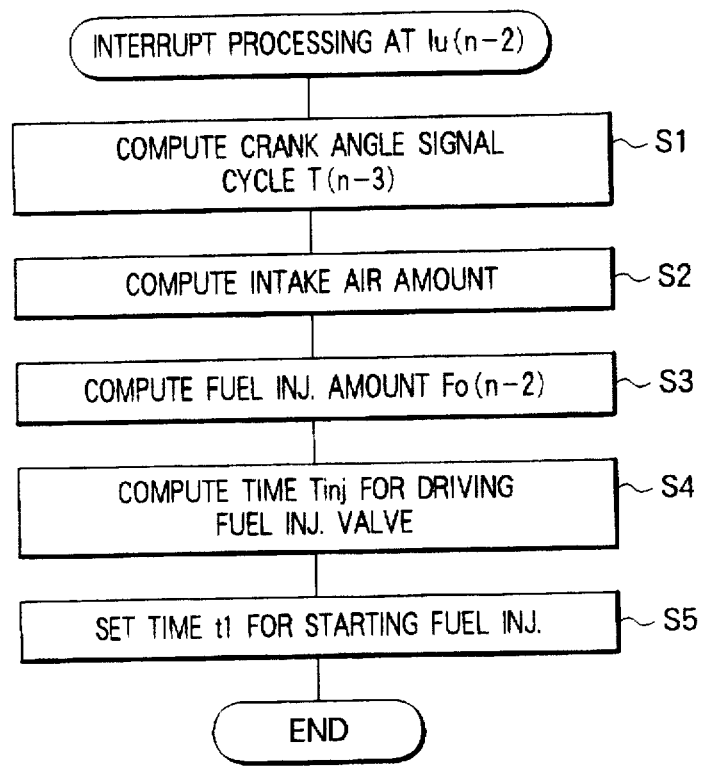
FIG. 14 is a flowchart illustrating the interrupt processing operation at the rising edge of a crank angle signal of the fuel injection processing implemented by a conventional cylinder injection fuel control device for an internal-combustion engine.
Figure 15:
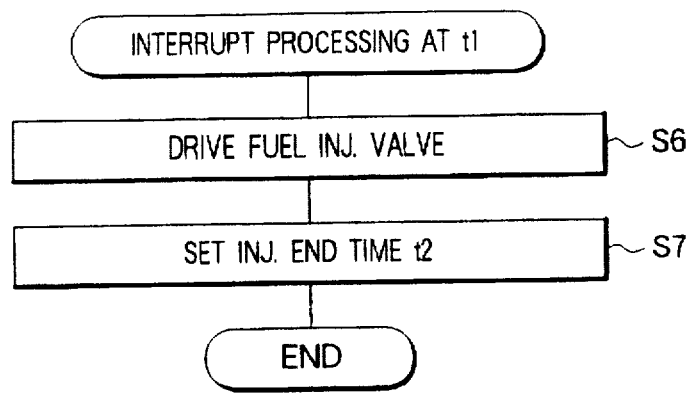
FIG. 15 is a flowchart illustrating the timer interrupt processing operation at time t1 of the fuel injection processing implemented by a conventional cylinder injection fuel control device for an internal-combustion engine.

Moreover, since fuel is injected in the compression stroke in response to the third injection signal J3, a layer of a relatively rich mixture is formed around the spark plug 10 as shown in FIG. 12, permitting reliable, easy ignition of fuel.

A change in the third fuel injection amount F3 in the compression stroke markedly affects the performance of the engine 1 including the torque generated; in this embodiment, however, the pulse width Tinj3 of the third injection signal J3 is set to the fixed value τ, so that the injection amount F3 in the compression stroke does not vary and the combustion efficiency of the engine 1 in the compression stroke is not affected.

Therefore, the output of the engine 1 can be controlled by the first fuel amount F1 and the second fuel amount F2 injected in the suction stroke, especially the fuel amount F2 based on the second injection signal J2 which is corrected.

Second Embodiment

In the first embodiment described above, among the three injection signals J1 through J3, the first injection signal J1 and the second injection signal J2 are issued in the suction stroke. Alternatively, however, the first injection signal J1 may be issued in the exhaust stroke and only the second injection signal J2 may be issued in the suction stroke as illustrated in FIG. 6A through FIG. 6D.

FIG. 6A through FIG. 6D are timing charts illustrative of the fuel injection in accordance with a second embodiment of the present invention. In FIG. 6C, the injection signal J for the fuel injection valve 8 of cylinder #1 is divided into three injection signals J1 through J3 for each control stroke, wherein the first injection signal J1 is issued in the exhaust stroke.

The rest of the operation is the same as that previously described with reference to FIG. 1A through FIG. 1D to FIG. 5. The second injection signal J2 is issued in the suction stroke, and the third injection signal J3 is issued in the compression stroke.

In this embodiment, the first injection signal J1 issued in the exhaust stroke is used to inject fuel in injection amount F1 computed using crank angle cycle T(n−3); the second injection signal J2 issued in the suction stroke is used to correct fuel amount F2 by taking the most up-to-date fuel amount computed based on the crank angle cycle T(n−2) into account; and the third injection signal J3 issued in the compression stroke is used to inject fuel in the fixed amount F3 based on the fixed pulse width τ.

Thus, as in the case previously described, the fuel amount can be corrected using the second injection signal J2.

Furthermore, the fuel injected in the exhaust stroke is warmed by exhaust gas by issuing the first injection signal J1 in the exhaust stroke, so that the carburetion of fuel is expedited and the combustion efficiency can be improved especially when the engine 1 is cold. In addition, if a part of the fuel injected in the exhaust stroke is discharged through an exhaust port into an exhaust pipe without staying in a cylinder, then unburnt gas burns in the vicinity of a catalyst 16 to heat catalyst 16; therefore, the activation of the catalyst can be expedited after startup with the engine in a d state.

What is claimed is:

1. A cylinder injection fuel control device for an internal-combustion engine which has a fuel injection valve for directly injecting fuel into each cylinder of an internal-combustion engine and which supplies the amount of fuel required for a single stroke of each cylinder by applying, to each fuel injection valve, an injection signal of a pulse width corresponding to the driving time of each fuel injection valve; wherein said injection signal applied for a single stroke of each cylinder is divided into three pulses, and the amount of fuel required for a single stroke is divided into three portions;

a first injection signal and a second injection signal are respectively applied during a suction stroke, and a third injection signal is applies during a compression stroke to said fuel injection valve of said each cylinder; and the amount of fuel supplied in response to said second injection signal is corrected in accordance with the operational state of said internal-combustion engine.

2. A cylinder injection fuel control device for an internal-combustion engine according to claim 1, wherein the amount of fuel supplied in response to said third injection signal is set to a fixed value.

3. A cylinder injection fuel control device for an internal-combustion engine which has a fuel injection valve for directly injecting fuel into each cylinder of an internal-combustion engine and which supplies the amount of fuel required for a single stroke of each cylinder by applying, to each fuel injection valve, an injection signal of a pulse width corresponding to the driving time of each fuel injection valve; wherein said injection signal applied for a single stroke of each cylinder is divided into three pulses, and the amount of fuel required for a single stroke is divided into three portions; and a first injection signal is applied in an exhaust stroke, a second injection signal is applied in a suction stroke, and a third injection signal is applied in a compression stroke to said fuel injection valve of said each cylinder.

4. A cylinder injection fuel control device for an internal-combustion engine according to claim 3, wherein the amount of fuel supplied in response to said second injection signal is corrected according to the operational state of said internal-combustion engine.

5. A cylinder injection fuel control device for an internal-combustion engine according to claim 3, wherein the amount of fuel supplied in response to said third injection signal is set to a fixed value.

* * * * *

UNITED STATES PATENT AND TRADEMARK OFFICE
CERTIFICATE OF CORRECTION

PATENT NO. : 5,794,585
DATED : August 18, 1998
INVENTOR(S) : SHIRO YONEZAWA

It is certified that error(s) appears in the above-identified patent and that said Letters Patent is hereby corrected as shown below:

IN THE CLAIMS:

Claim 1, line 15, delete "applies" and insert --applied--.

Signed and Sealed this

Twenty-ninth Day of December, 1998

*Attest:*

BRUCE LEHMAN

*Attesting Officer*     *Commissioner of Patents and Trademarks*